(12) United States Patent
Kanai et al.

(10) Patent No.: US 6,590,617 B1
(45) Date of Patent: Jul. 8, 2003

(54) EDGE EMPHASIS DEVICE, IMAGE FORMING APPARATUS, IMAGE SIGNAL PROCESSING METHOD, AND IMAGE FORMING METHOD

(75) Inventors: Izumi Kanai, Sagamihara (JP); Yukio Hiraki, Atsugi (JP); Kohei Inamura, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/507,942

(22) Filed: Feb. 22, 2000

(30) Foreign Application Priority Data

Feb. 24, 1999 (JP) ............................................. 11-047161
Feb. 9, 2000 (JP) ........................................ 2000-032261

(51) Int. Cl.[7] ............................................... H04N 5/208
(52) U.S. Cl. ........................ 348/625; 345/589; 345/611; 382/263; 382/266; 382/267; 382/268; 382/269; 348/606; 348/627; 348/628; 327/170
(58) Field of Search .................................. 348/625, 606, 348/627, 628; 382/263, 266, 267, 268, 269; 327/170; 345/589, 611

(56) References Cited

U.S. PATENT DOCUMENTS 5,196,736 A * 3/1993 Doornhein et al. ......... 327/170
5,321,511 A * 6/1994 Min ............................ 348/614

* cited by examiner

Primary Examiner—Jeffery Brier
Assistant Examiner—Javid Amini
(74) Attorney, Agent, or Firm—Fitzpatrick, Cella, Harper & Scinto (57) ABSTRACT

This invention can suppress overshoot/undershoot, and can maintain the improvement effect of the leading edge of an edge portion. For this purpose, a second derivative signal generator (1) generates a second derivative signal (s5) on the basis of time-serially input three successive pixels. A second derivative signal suppression unit (2) generates a signal (s8) obtained by suppressing the second derivative signal, and a signal (s9) indicating the sign of the second derivative signal. The absolute values of the differences between the pixel of interest, and its neighboring pixels are computed, and a smaller one of the absolute values is selected as a signal (s14) by a minimum value selection circuit (18). By multiplying the obtained signals (s8, s9, s14) by a multiplier (19), an edge-emphasizing signal (s15) is generated. The edge-emphasizing signal (s15) is added to the signal of the pixel of interest by an adder (20), thus obtaining an edge-emphasized signal s16.

2 Claims, 8 Drawing Sheets

EDGE EMPHASIS DEVICE, IMAGE FORMING APPARATUS, IMAGE SIGNAL PROCESSING METHOD, AND IMAGE FORMING METHOD

FIELD OF THE INVENTION

The present invention relates to a device for emphasizing an edge of a video signal.

BACKGROUND OF THE INVENTION

Sharpness is one important factor that determines image quality. An edge emphasis circuit is used to improve the sharpness.

Figure 6:
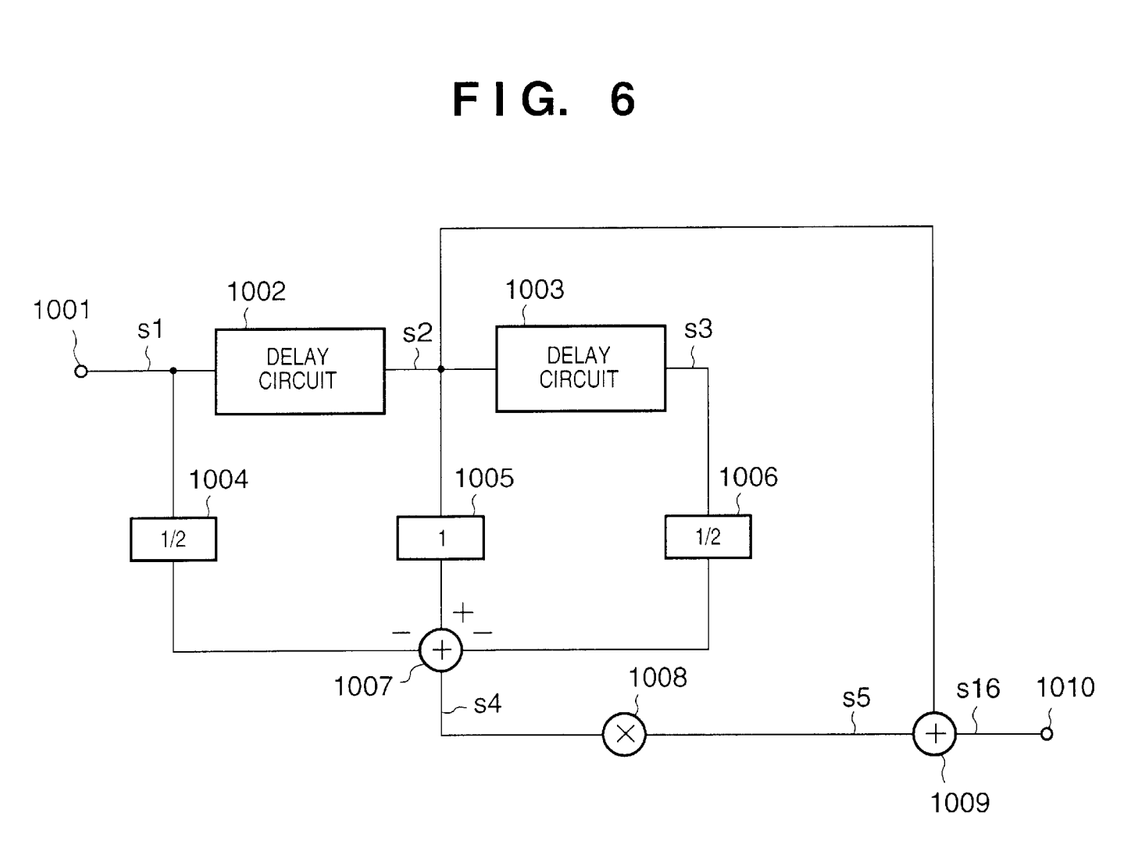
FIG. 6 is a circuit diagram of a conventional edge emphasis circuit.
Figure 7:
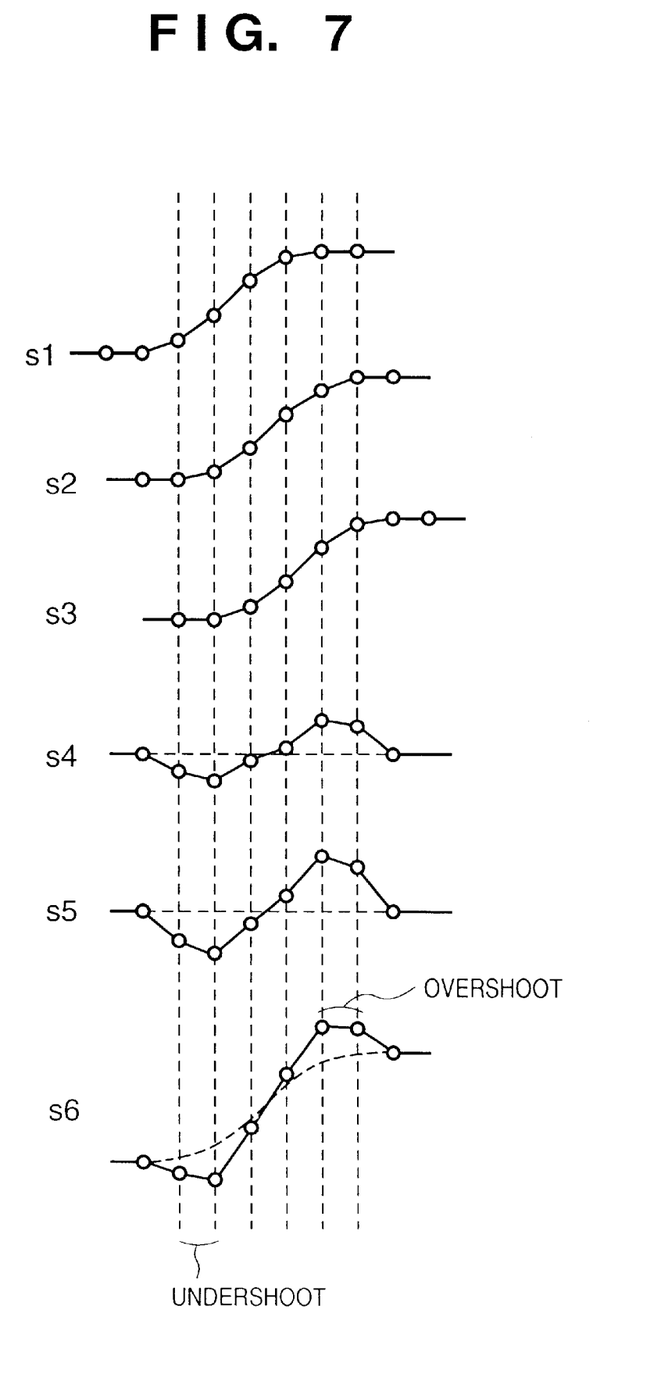
FIG. 7 is a chart showing processes of edge emphasis by the conventional edge emphasis circuit.

FIG. 6 shows a conventional edge emphasis circuit. Referring to FIG. 6, reference numeral 1001 denotes a video input terminal; 1002 and 1003, delay circuits; 1004, 1005, and 1006, multipliers; 1007, an adder; 1008, a multiplier; 1009, an adder; and 1010, a video output terminal. Also, reference numerals s1 to s6 denote signals at respective circuits. FIG. 7 shows the waveforms of these signals.

An input video signal s1 is input to the multiplier 1004 and first delay circuit 1002. The first delay circuit 1002 delays the input signal one pixel, and outputs a signal s2. The signal s2 is input to the multiplier 1005, second delay circuit 1003, and adder 1009. The signal input to the second delay circuit 1003 is further delayed one pixel, and is output as a signal s3. The waveforms of these three signals s1, s2, and s3 are as shown in FIG. 7. That is, these signals are delayed one pixel each.

These signals s1, s2, and s3 are respectively input to the multipliers 1004, 1005, and 1006, and are respectively multiplied by ½, 1, and ½. The signs of the signals s1 and s3 are inverted, and the inverted signals s1 and s3, and non-inverted signal s2 are input to the adder 1007. The adder 1007 adds these signals, and outputs a sum signal s4. That is, the signal s4 assumes a value obtained by subtracting the average value of the previous and next image data from an image data value at a given point, i.e., a second derivative value at that point. The waveform of the signal s4 is as shown in FIG. 7.

Furthermore, the multiplier 1008 amplifies the signal s4 to obtain a signal s5. The signal s5 is an edge-emphasized signal. The adder 1009 adds the signal s2 output from the delay circuit 1002 to the edge-emphasized signal s5, thus generating an edge-emphasized video signal s6. A signal indicated by the solid curve in the signal s6 in FIG. 7 is the edge-emphasized signal, and a signal indicated by the broken curve is the original signal s2.

However, in the conventional edge emphasis circuit described above, as indicated by the solid curve in the signal s6 in FIG. 7, the leading edge of an edge portion of the signal can be improved, while overshot and undershot portions are produced. If such overshoot and undershoot are considerable, the image quality deteriorates due to a fringe formed at the boundary. When the coefficient of the multiplier 1008 is decreased to eliminate such overshoot and undershoot, the edge emphasis amount decreases in turn, and the improvement effect of the leading edge of the edge portion becomes small.

As described above, in the conventional edge emphasis circuit, the leading or trailing edge of the edge portion can be improved to obtain a sufficient edge emphasis effect, while overshoot and undershoot tend to increase, resulting in deterioration of image quality.

SUMMARY OF THE INVENTION

The present invention has been made in consideration of the above situation, and has as its object to provide an edge emphasis device which can maintain the improvement effect of the leading edge of an edge portion while suppressing overshoot and undershoot.

The present invention also provides a device which can set the overshoot/undershoot suppression level.

In order to achieve the above object, an edge emphasis device of the present invention comprises the following arrangement. That is, there is provided an edge emphasis device comprising:

extraction means for extracting signals for three pixels including a pixel of interest and two neighboring pixels, from a time-serially input video signal;

first computation means for computing absolute values of differences between the extracted pixel of interest and the two neighboring pixels;

means for selecting a smaller one of the two absolute values obtained by the first computation means, and outputting the selected value as a first signal;

second computation means for computing a second derivative on the basis of the signal for three pixels extracted by the extraction means, and outputting the second derivative signal as a second signal;

third computation means for computing an absolute value of the second signal, comparing the absolute value with a predetermined threshold value, selecting a smaller one of the absolute value and threshold value, and outputting the selected value as a third signal;

sign checking means for checking a sign of the second signal, and outputting a checking result as a fourth signal;

fourth computation means for generating an edge-emphasizing signal on the basis of the first, third and fourth signals; and addition means for adding the edge-emphasizing signal obtained by the fourth computation means to the signal of the pixel of interest, and outputting the sum signal as an edge-emphasized signal.

Also, according to a preferred embodiment of the present invention, the edge emphasis device comprises the following arrangement.

That is, an edge emphasis device comprises delay means for delaying an input first signal a predetermined period time to generate a second signal, delay means for further delaying the second signal the predetermined time to generate a third signal, three multiplication means for respectively multiplying the first, second, and third signals by predetermined coefficients to generate fourth, fifth, and sixth signals, computation means for computing the fourth, fifth, and sixth signals to output a seventh signal as a second derivative signal, minimum value selection means for comparing the absolute value of the seventh signal and a given adjustable value, selecting a smaller one, and outputting the selected signal as an eighth signal, sign checking means for checking the sign of the seventh signal, and outputting a ninth signal, minimum value selection means for comparing the absolute value of the difference between the first and second signals, and that of the difference between the second and third signals, selecting a smaller one, and outputting the selected signals as a tenth signal, multiplication means for multiplying the eighth and tenth signals, and determining the sign of the product based on the ninth signal to generate an eleventh signal, and addition means for adding the eleventh signal and a signal obtained by delaying the second signal the predetermined time.

Alternatively, the edge emphasis device the following arrangement.

That is, an edge emphasis device comprises delay means for delaying an input first signal a predetermined period time to generate a second signal, delay means for further delaying the second signal the predetermined time to generate a third signal, three multiplication means for respectively multiplying the first, second, and third signals by predetermined coefficients to generate fourth, fifth, and sixth signals, computation means for computing the fourth, fifth, and sixth signals to output a seventh signal as a second derivative signal, means for suppressing the seventh signal to have a value within a given range, and outputting the suppressed signal as an eighth signal, minimum value selection means for comparing the absolute value of the difference between the first and second signals, and that of the difference between the second and third signals, selecting a smaller one, and outputting the selected signals as a tenth signal, multiplication means for multiplying the eighth and tenth signals to generate an eleventh signal, and addition means for adding the eleventh signal and a signal obtained by delaying the second signal the predetermined time.

The present application includes the following invention.

That is, one of the inventions of an edge emphasis device associated with the present application is an edge emphasis device for emphasizing an edge of an image signal, comprising:

a preliminary signal generation circuit for generating, on the basis of a target signal, a lead signal that leads ahead of the target signal a predetermined time, and a lag signal that lags behind the target signal a predetermined time, a preliminary signal as a second derivative signal of the target signal;

a limiting circuit for limiting a value of the preliminary signal using a predetermined upper limit value when the value of the preliminary signal is larger than the upper limit value, limiting the value of the preliminary signal using a predetermined lower limit value when the value of the preliminary signal is smaller than the lower limit value, or imposing both limitations using the upper and lower limit values; and an edge-emphasizing signal generation circuit for generating an edge-emphasizing signal by computing a product of a minimum value of an absolute value of a difference between the target signal and the lead signal and an absolute value of a difference between the target signal and the lag signal, and an output value from the limiting circuit.

Note that the predetermined time the lead signal leads ahead of the target signal is preferably equal to the predetermined time the lag signal lags behind the target signal. Also, the predetermined time the lead signal leads ahead of the target signal and/or the predetermined time the lag signal lags behind the target signal is preferably equal to the interval between signals corresponding to neighboring pixels in the input signal upon image information.

The respective circuits can have various patterns. Also, the respective circuits may be integrated to build an integrated circuit.

In the present invention, the edge-emphasizing signal becomes the one corresponding to the target signal.

Therefore, a circuit for generating an edge-emphasized signal using the edge-emphasizing signal as a compensation signal corresponding to the target signal can obtain the edge-emphasized signal. More specifically, by adding the edge-emphasizing signal to a signal to be emphasized, the edge-emphasized signal can be obtained. Especially, the edge-emphasizing signal often has a delay that cannot be ignored with respect to the signal to which the edge-emphasizing signal is added. In such case, these signals can be added in correspondence with each other. More specifically, as will be described later in the following embodiment, an arrangement for delaying the target signal in correspondence with the timing of the edge-emphasizing signal corresponding to the target signal is preferably used.

Note that the second derivative signal means "a signal that represents the difference between the image signal amplitude (or image data value) of a given point (or pixel) and those of surrounding points (pixels)". More specifically, a value obtained by subtracting the average value of the lead signal that leads ahead of the target signal the predetermined time, and the lag signal that lags behind the target signal the predetermined time from the target signal can be preferably used.

The present application includes the invention of an image forming apparatus which has the aforementioned edge emphasis device, and an image forming unit for forming an image on the basis of a signal, the edge of which is emphasized by the edge emphasis device. Note that the image forming unit can preferably use, for example, a display for displaying an image.

The present application includes the following invention as an image signal processing method.

An image signal processing method comprises the steps of:

generating, on the basis of a target signal, a lead signal that leads ahead of the target signal a predetermined time, and a lag signal that lags behind the target signal a predetermined time, a preliminary signal as a second derivative signal of the target signal;

limiting a value of the preliminary signal using a predetermined upper limit value when the value of the preliminary signal is larger than the upper limit value, limiting the value of the preliminary signal using a predetermined lower limit value when the value of the preliminary signal is smaller than the lower limit value, or imposing both limitations using the upper and lower limit values; and generating an edge-emphasizing signal by computing a product of a minimum value of an absolute value of a difference between the target signal and the lead signal and an absolute value of a difference between the target signal and the lag signal, and the limited value.

Especially, the method preferably further comprising the step of generating an edge-emphasized signal using the edge-emphasizing signal as a compensation signal corresponding to the target signal.

The present application includes, as an invention of an image forming method, that of an image forming method for forming an image on the basis of a signal obtained by the aforementioned image signal processing method.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

The preferred embodiments of the present invention will be described in detail hereinafter with reference to the accompanying drawings.

[First Embodiment]

Figure 1:
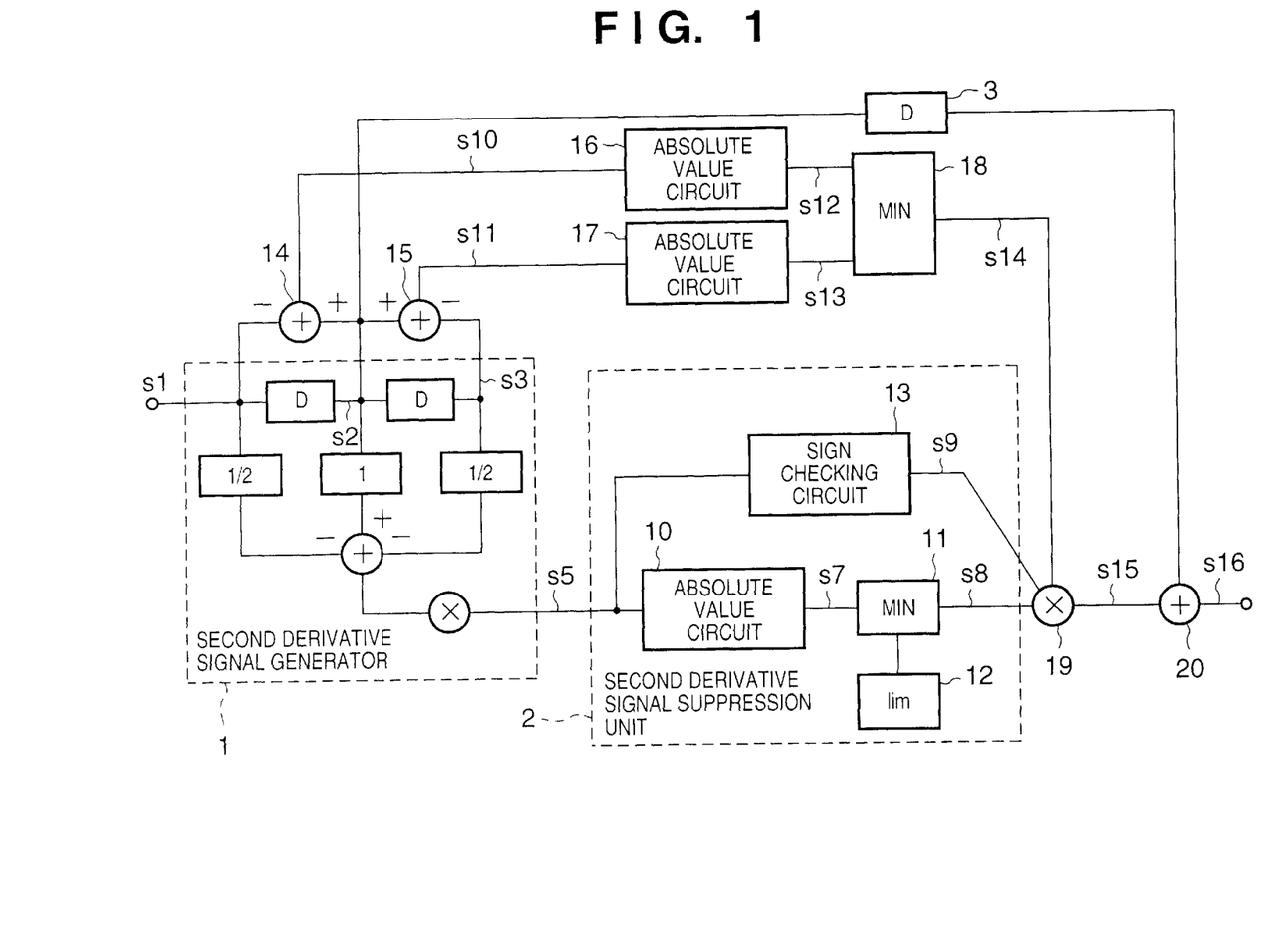
FIG. 1 is a circuit diagram showing the arrangement of an edge emphasis circuit according to the first embodiment of the present invention.

The operation of this embodiment will be described in detail below using a circuit diagram. FIG. 1 is a circuit diagram of an edge emphasis circuit according to this embodiment.

Referring to FIG. 1, reference numeral 1 denotes a second derivative signal generator, which is the same as that described in the prior art. For example, the generator 1 generates a second derivative signal from successive sampling points obtained by sampling an NTSC signal input to a video signal input terminal. An output signal s5 from the second derivative generator 1 is a second derivative signal, as indicated by the signal s5 in FIG. 7. In the conventional circuit, this signal s5 is added to an original signal s2 as an edge-emphasizing signal. However, this embodiment uses this second derivative signal as a preliminary signal, and also uses the following circuit to suppress overshoot and undershoot.

Reference numeral 2 denotes a second derivative suppression unit, which sets an upper limit value for a second derivative signal, and suppresses the signal not to exceed the upper limit value. Reference numeral 10 denotes an absolute value circuit for outputting a signal s7 indicating the absolute value of the signal s5. Reference numeral 11 denotes a minimum value selection circuit for selecting a smaller one of the absolute value signal s7 and an upper limit lim of a second derivative, and outputting a signal s8. The upper limit value lim is always set at a positive value, and a fixed value may be set in advance in the circuit or an arbitrary value may be externally set by the user as needed. The edge-emphasizing signal becomes larger with increasing upper limit value lim. Reference numeral 12 denotes a circuit for outputting the upper limit value lim of a second derivative; and 13, a circuit for checking the sign of the second derivative signal s5. The sign checking circuit 13 outputs a signal s9, which assumes, e.g., "1" if the second derivative signal s5 is equal to or larger than "0", or "−1" if the signal s5 is negative.

Reference numeral 14 denotes an adder for computing a signal s10 as the difference between the input signal s1 and the signal s2 obtained by delaying the signal s1 one pixel; and 15, an adder for computing a signal s11 as the difference between the signal s2, and a signal s3 obtained by further delaying the signal s2 one pixel. Reference numerals 16 and 17 denote circuits for computing absolute values s12 and s13 of the signals s10 and s11. Reference numeral 18 denotes a minimum value selection circuit for outputting a smaller one of the values s12 and s13 as an output signal s14. When the signal s2 is used as a target signal, the signal s1 is a lag signal, and the signal s3 is a lead signal.

Reference numeral 19 denotes a multiplier (edge emphasis circuit) for multiplying the signals s8, s9, and s14. An output signal s15 from the multiplier 19 is used as an edge-emphasizing signal. The signal s2 obtained by delaying the input signal s1 one pixel is delayed a predetermined time by a delay circuit 3, and the delayed signal is added to the edge-emphasizing signal s15 by an adder 20. The delay circuit 13 compensates for a time required for generating the edge-emphasizing signal s15.

Figure 2:
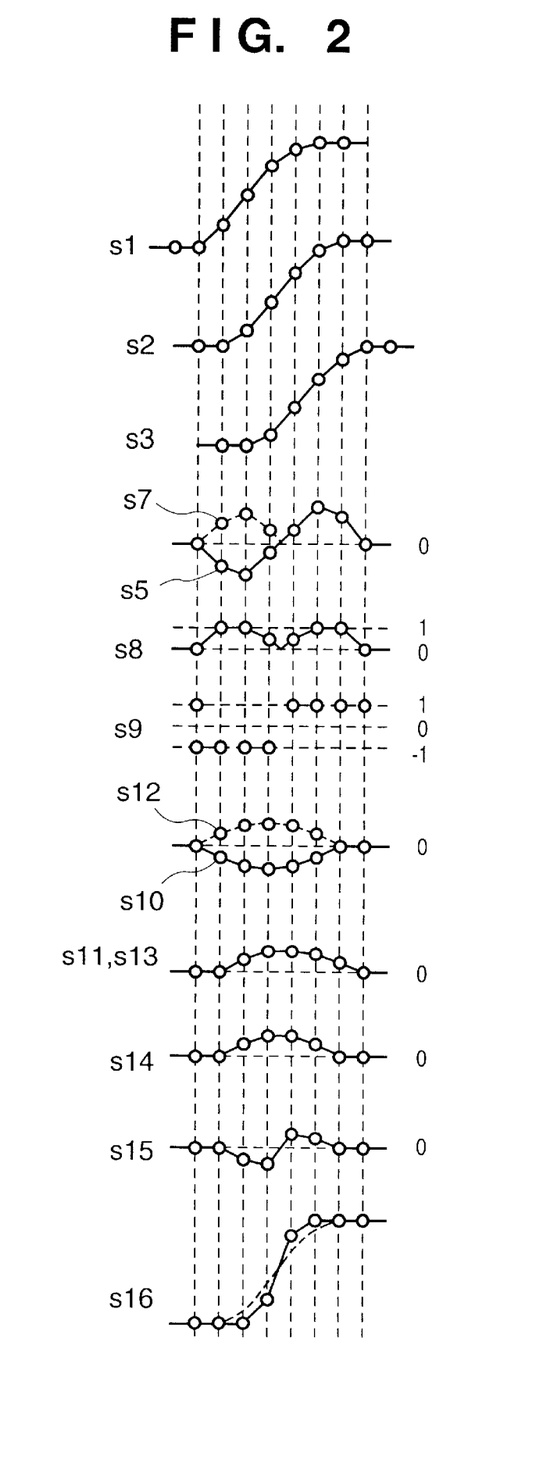
FIG. 2 is a chart for explaining signal processing of the first embodiment.

The processes in the present invention with the above arrangement will be explained below using FIG. 2. FIG. 2 shows signal waveforms in the processes of adding an edge-emphasizing signal to an original signal by the circuits of this embodiment.

Reference numeral s1 denotes an input video signal; s2, a signal obtained by delaying the signal s1 one pixel; and s3, a signal obtained by delaying the signal s2 one pixel. Based on these signals, a second derivative signal s5 is generated. These signals are the same as those in the prior art.

The second derivative signal s5 is supplied to the absolute value circuit 10 and sign checking circuit 13.

When the signal s5 is negative, the absolute value circuit 10 generates a signal s7 obtained by inverting its sign. The minimum value selection circuit 11 selects a smaller one of the upper limit lim of the second derivative signal and the signal s7. For example, when lim=1, an output signal s8 is as shown in FIG. 2. As described above, the value lim may be set in advance in the circuit or may be externally set by the user.

The second derivative signal s5 is also input to the sign checking circuit 13, which outputs an output signal s9 that assumes "1" if the signal s5 is equal to or larger than 0, or "−1" if the signal s5 is negative. The signal s9 is input to the multiplier 19 and is used to determine the sign of the edge emphasis circuit. The multiplier 19 multiplies the positive signals s8 and s14 and the signal s9 which assumes "1" or "−1". For this reason, the sign of a signal s15 as the product, i.e., the edge-emphasizing signal, matches that of the signal s9. Therefore, the signal s9 determines the sign of the edge-emphasizing signal s15. In other words, in the present invention, the sign of the edge-emphasizing signal always matches that of the second derivative signal.

The adders 14 and 15 respectively output a signal s10 as the difference (s2−s1) between the signals s1 and s2, and a signal s11 as the difference (s2−s3) between the signals s2 and s3. These signals are as shown in FIG. 2. The absolute value circuits 16 and 17 respectively compute the absolute values of the signals s10 and s11, and output signals s12 and s13. In the example shown in FIG. 2, the signal s10 is different from the signal s12 since it has a negative portion, but the signals s11 and s13 are the same signals.

The minimum value selection circuit 18 outputs a signal s4 as a smaller one of the signals s12 and s13. That is, let P0 be the image data (signal s2) of the pixel of interest, and P+ and P− be the image data of pixels before and after the pixel of interest. Then, the signal s14 assumes a value given by:

$$\mathrm{MIN}(|P0-P+|, |P0-P-|) \qquad (1)$$

(where MIN is the function of outputting the smallest value among arguments)

The signal s8 obtained by suppressing the second derivative signal by the upper limit, and the signal s9 indicating the sign of the second derivative signal, and the signal s14 are multiplied by the multiplier 19 to obtain an edge-emphasizing signal s15. When the edge-emphasizing signal s15 and a signal obtained by appropriately delaying the signal s2 are added by the adder 20, an edge-emphasized signal s16 can be obtained. An original signal is indicated by the dotted curve in s16 shown in FIG. 2.

In the example shown in FIG. 2, the upper limit value lim of the second derivative signal is set at "1". For this reason, the edge-emphasizing signal s15 never exceeds the value of the signal s14. That is, the signal s15 never exceeds the value given by equation (1). Therefore, since the pixel value of interest can be prevented from increasing or decreasing beyond the neighboring pixels, overshoot and undershoot can be completely eliminated.

Figure 3:
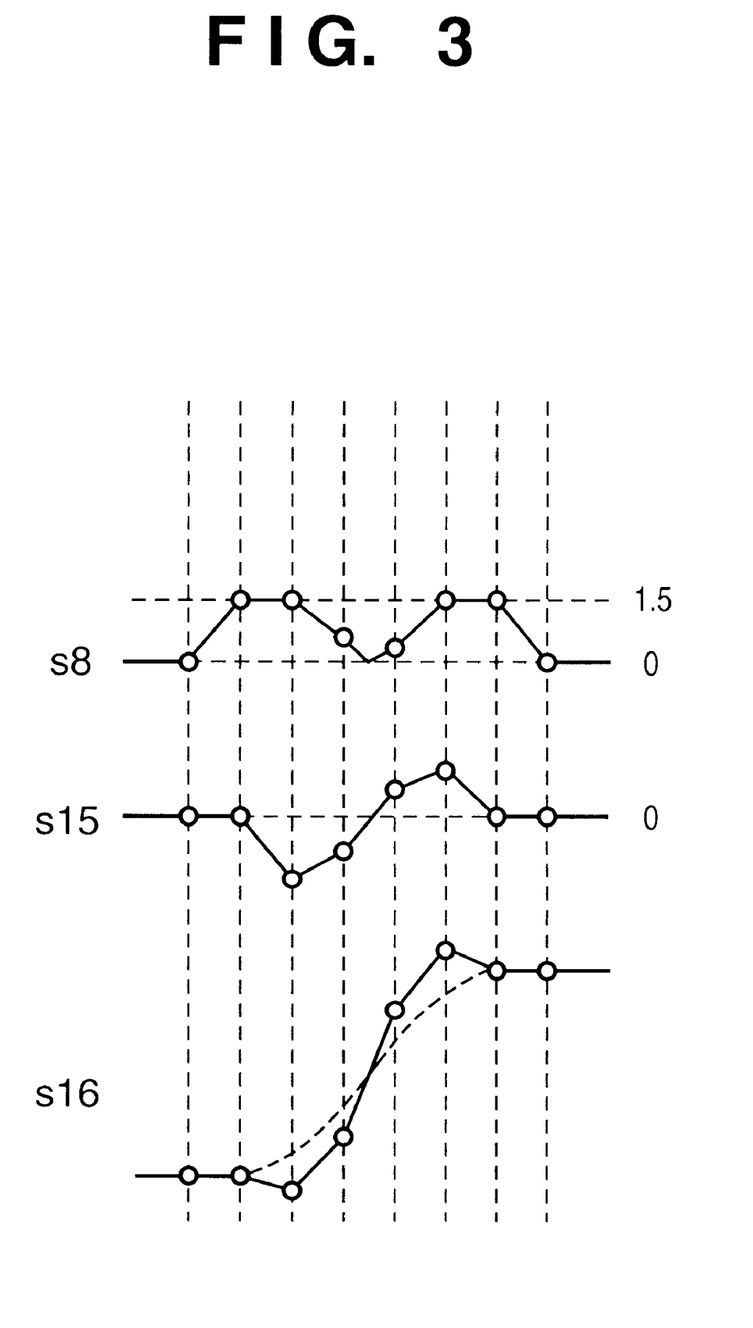
FIG. 3 is a chart for explaining signal processing of the first embodiment.

When lim is set at "1" or more, overshoot/undershoot may appear, as shown in FIG. 3. FIG. 3 shows only the signals s8, s15, and s16 different from those in FIG. 2, when lim=1.5.

In this manner, according to this embodiment, the magnitude of overshoot/undershoot can be easily changed by changing the value lim. At this time, the improvement effect of the leading edge of an edge portion can be maintained.

In the first embodiment, the absolute value of the second derivative signal as a preliminary signal is computed, and the upper limit of the absolute value is limited. After that, the sign of the second derivative signal is given to the absolute value, thus simultaneously imposing upper and lower limits. However, when only the upper limit is imposed, the absolute value circuit 10 and sign checking circuit 13 can be omitted. Also, when only the lower limit is imposed, the absolute value circuit 10 and sign checking circuit 13 can be omitted, a lower limit output circuit (having the same arrangement as that of the upper limit output circuit but a different setting value) can be used in place of the upper limit output circuit 12, and a maximum value selection circuit can be used in place of the minimum value selection circuit 11.

The second embodiment to be described below will provide an arrangement for individually imposing the upper and lower limit values.

[Second Embodiment]

The second embodiment of the present invention will be described below.

Figure 4:
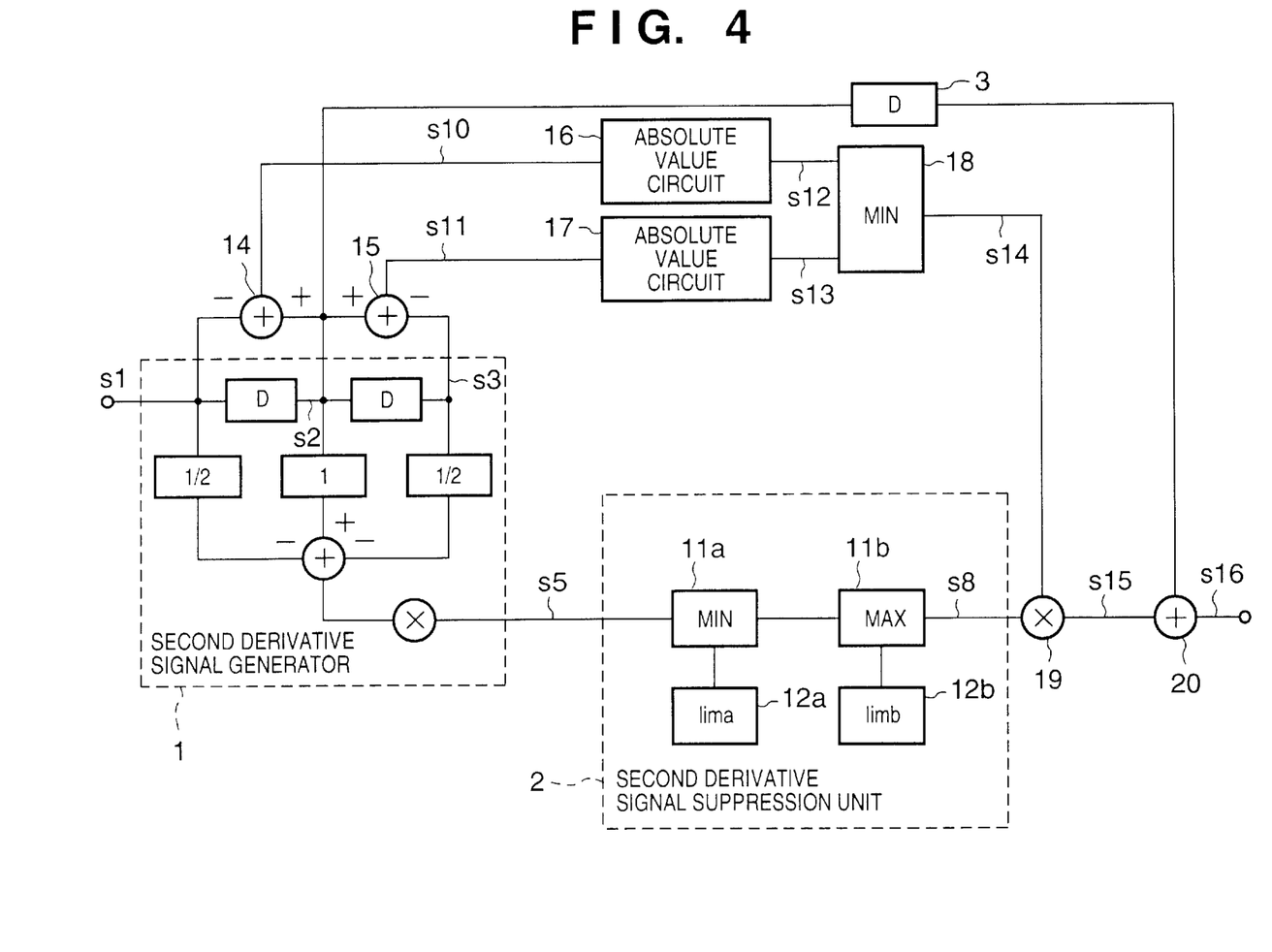
FIG. 4 is a circuit diagram showing the arrangement of an edge emphasis circuit according to the second embodiment of the present invention.

FIG. 4 is a circuit diagram of the second embodiment. The difference from the first embodiment shown in FIG. 1 is only the second derivative signal suppression unit 2. Hence, the second derivative signal suppression unit 2 will be mainly explained below.

Reference numeral 11a denotes a minimum value selection circuit for outputting a smaller one of the second derivative signal s5 and an upper limit value lima of a second derivative; and 11b, a maximum value selection circuit for outputting a larger one of the output from the minimum value selection circuit 11a and a lower limit value limb of the second derivative. That is, the derivative signal suppression unit 2 outputs the second derivative signal while suppressing it to fall within the range from limb to lima. This output is s8.

Figure 5:
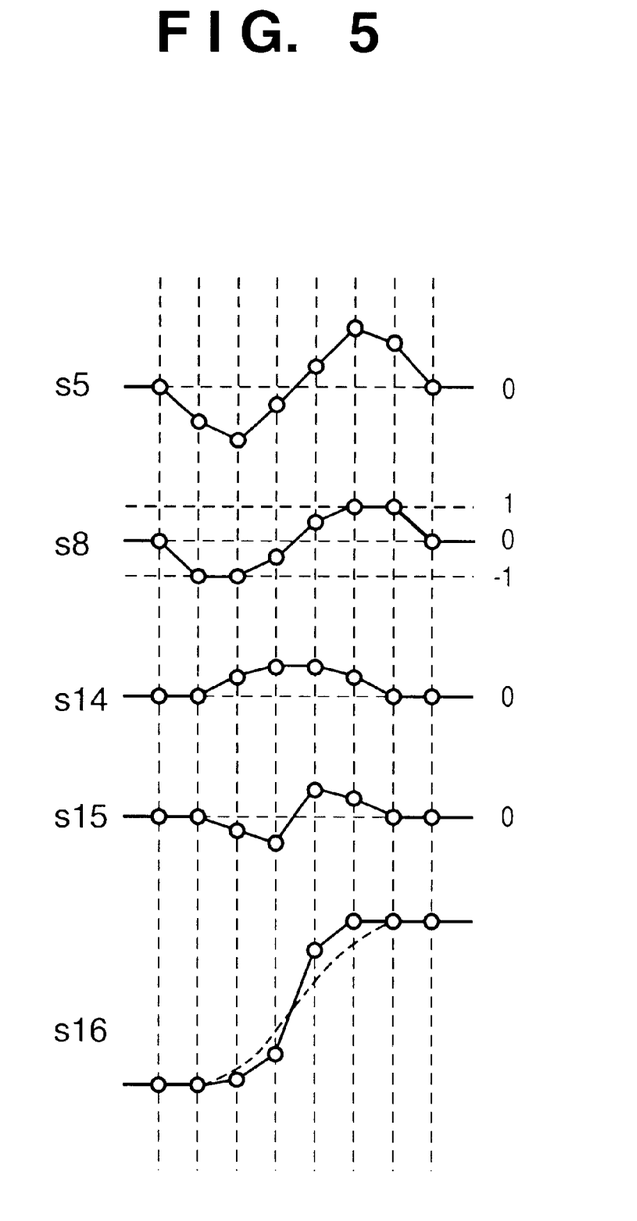
FIG. 5 is a chart for explaining signal processing of the second embodiment.

FIG. 5 shows signal processes.

The second derivative signal s5 is generated in the same manner as in the first embodiment. When the signal s5 has passed through the second derivative signal suppression unit 2, it is converted into the signal s8 falling within the range from limb to lima. In the example shown in FIG. 5, lima=1, and limb=−1. For the same reason as in the first embodiment, no overshoot/undershoot is produced at all.

The signal s14 has the same waveform as that in the first embodiment, since the circuit remains the same. By multiplying the signals s14 and s8 by the multiplier 19, an edge-emphasizing signal s15 is obtained. When the signal s15 is added to an original signal, an edge-emphasized image signal s16 is generated.

According to this embodiment, since lima and limb can be individually set, overshoot and undershoot can be individually, i.e., independently controlled. In general, overshoot is more conspicuous than undershoot, and often impairs image quality. To avoid such situation, lima may be set at, e.g., "1" to suppress overshoot, and limb at a less strict value such as "−1.5" to suppress undershoot moderately.

Note that lim in the first embodiment and lima and limb in the second embodiment may be adjusted by, e.g., a volume.

As described above, according to this embodiment, the magnitude of overshoot/undershoot can be easily changed by changing the upper limit value (lim) of the second derivative. At this time, the improvement effect of the leading edge of an edge portion can be maintained.

Furthermore, with the circuit arrangement of the second embodiment, since the upper and lower limit values of the second derivative can be individually set, overshoot and undershoot can be individually suppressed. In general, overshoot is more conspicuous than undershoot, and often impairs image quality. To avoid such situation, overshoot may be suppressed, and undershoot may be suppressed moderately.

In the above embodiment, the edge emphasis circuit has been explained. A device expressed by such device may be built in a video processing apparatus (television apparatus, video deck, or the like) such as a display apparatus, or may be a device independent from the video processing apparatus.

Figure 8:
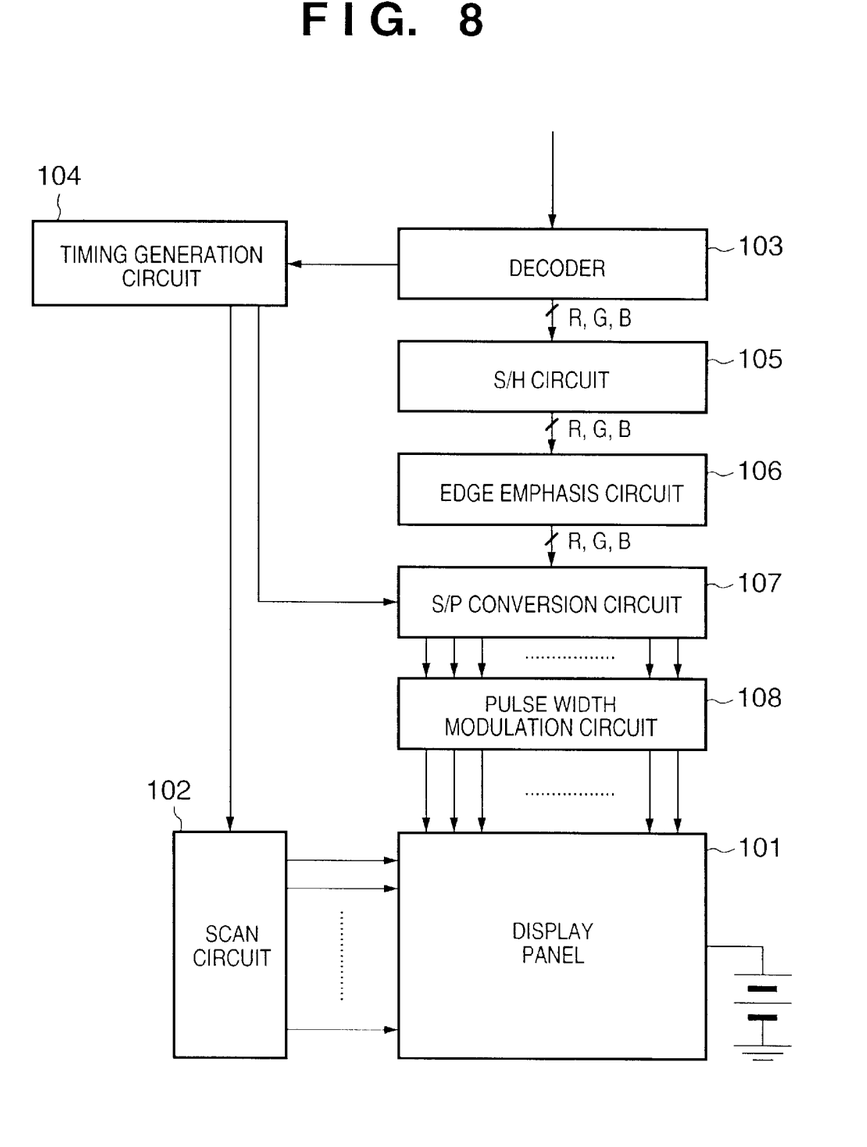
FIG. 8 is a block diagram showing the arrangement of an image forming apparatus to which the embodiment of the present invention is applied.

FIG. 8 shows an example in which the edge emphasis circuit is applied to a display apparatus. Referring to FIG. 8, a display panel 101 is constructed by a base board which is prepared by arranging a plurality of surface conduction electron emission elements in a matrix and serves as an electron source, light-emitting members which receive electrons emitted by the surface conduction electron emission elements of the base board and emit light, and acceleration electrodes for accelerating electrons produced by the base board toward the light-emitting members, as has been proposed by the assignee of the present applicant.

A decoder 103 receives an externally input signal (e.g., NTSC video signal), separates the input signal into color component signals R, G, and B, and outputs horizontal and vertical sync signals of the input signal to a timing generator 104. The timing generator 104 generates timing signals for specifying the operations of individual circuits on the basis of the input signals. The R, G, and B signals output from the decoder 103 are sampled by a sample & hold circuit 105 and are converted into digital data. An edge emphasis circuit 106 corresponds to the edge emphasis device described in the first or second embodiment. The signals output from the edge emphasis circuit 106 are converted into signals for one line by a serial/parallel conversion circuit 107, and are supplied to a pulse width modulation circuit 108 at the timing at which data for one line have been stored. The pulse width modulation circuit 108 performs pulse width modulation based on the input data values, and supplies them to respective column input terminals of the display panel 101. As described above, since the display panel 101 has a plurality of surface conduction electron emission elements arranged in a matrix, the input signals are displayed in units of lines. The line to be driven to display is controlled by a scan circuit 102. The scan circuit 102 applies a predetermined voltage to the line to be driven to display on the basis of the horizontal sync signal from the timing generator 104, and applies a non-driving voltage to other lines. This operation is repeated by switching the line to be driven in turn.

In this manner, an image forming apparatus having the edge emphasis circuit described in the first or second embodiment can be constructed. Note that the image forming apparatus uses the surface condition electron emission elements. However, the present invention is not limited to such specific apparatus, and the present invention can be applied to any other image forming apparatuses or display apparatuses.

To restate, according to the above embodiments, overshoot/undershoot can be suppressed, and the improvement effect of the leading edge of an edge portion can be maintained.

Furthermore, the overshoot/undershoot suppression level can be set.

Moreover, the overshoot and undershoot suppression levels can be individually set.

As described above, according to the present invention, edge emphasis can be done more desirably.

As many apparently widely different embodiments of the present invention can be made without departing from the spirit and scope thereof, it is to be understood that the invention is not limited to the specific embodiments thereof except as defined in the appended claims.

What is claimed is:

1. An edge emphasis device comprising:
    a first absolute value computation circuit arranged to compute an absolute value of a difference between a target signal and a lead signal obtained before the target signal by a predetermined time;
    a second absolute value computation circuit arranged to compute an absolute value of a difference between the target signal and a later signal obtained after the target signal by a predetermined time;
    a minimum value selection circuit arranged to select a smaller one of the absolute value computed by said first absolute value computation circuit and the absolute value computed by said second absolute value computation circuit;
    a second-derivative signal generation unit arranged to generate a second-derivative signal based on the target signal, the lead signal and the later signal;
    a second-derivative signal suppressing unit arranged to suppress the second-derivative signal generated by said second-derivative signal generation unit;
    a multiplying unit arranged to multiply the second-derivative signal suppressed by said second-derivative signal suppressing unit and the absolute value selected by said minimum value selection circuit; and
    an adding unit arranged to add the signal outputted by said multiplying unit to the target signal,
    wherein said second-derivative signal suppressing unit comprises:
        a minimum value selection circuit arranged to compute an absolute value of the second-derivative signal and to select a smaller one of the computed absolute value and a predetermined value; and
        a sign determination circuit arranged to determine the sign of the second-derivative signal generated by said second-derivative signal generation unit.

2. An edge emphasis device comprising:
    a first absolute value computation circuit arranged to compute an absolute value of a difference between a target signal and a lead signal obtained before the target signal by a predetermined time;
    a second absolute value computation circuit arranged to compute an absolute value of a difference between the target signal and a later signal obtained after the target signal by a predetermined time;
    a minimum value selection circuit arranged to select a smaller one of the absolute value computed by said first absolute value computation circuit and the absolute value computed by said second absolute value computation circuit;
    a second-derivative signal generation unit arranged to generate a second-derivative signal based on the target signal, the lead signal and the later signal;
    a second-derivative signal suppressing unit arranged to suppress the second-derivative signal generated by said second-derivative signal generation unit;
    a multiplying unit arranged to multiply the second-derivative signal suppressed by said second-derivative signal suppressing unit and the absolute value selected by said minimum value selection circuit; and
    an adding unit arranged to add the signal outputted by said multiplying unit to the target signal,
    wherein said second-derivative signal suppressing unit comprises:
        a minimum value selection circuit arranged to select a smaller one of the second-derivative signal and a predetermined upper limit value; and
        a maximum value selection circuit arranged to select a larger one of the second-derivative signal and a predetermined lower limit value.

* * * * *